United States Patent [19]

Shuman

[11] Patent Number: 4,758,048
[45] Date of Patent: Jul. 19, 1988

[54] ATTACHMENT CLIP FOR WEB-TYPE BELTS

[76] Inventor: Raymond L. Shuman, 4788 S. 4180 W., Salt Lake City, Utah 84118

[21] Appl. No.: 796,109

[22] Filed: Nov. 8, 1985

[51] Int. Cl.⁴ ............................................. A47C 31/00
[52] U.S. Cl. ..................................... 297/468; 24/200
[58] Field of Search .............. 24/194, 171, 181, 197, 24/198, 200, 193, 196; 297/468

[56] References Cited

U.S. PATENT DOCUMENTS

| | | | |
|---|---|---|---|
| 877,035 | 1/1908 | Barabasz | 24/200 |
| 1,361,113 | 12/1920 | Stevens | 24/200 X |
| 1,898,741 | 2/1933 | Peterson | 24/200 |
| 2,002,947 | 5/1935 | Jacobs | 24/200 |
| 2,064,447 | 12/1936 | Reutter | 24/198 |
| 2,728,966 | 1/1956 | Cantil | 24/196 |
| 4,117,573 | 10/1978 | Nakamura | 24/200 X |
| 4,392,277 | 7/1983 | Müller | 24/196 |

FOREIGN PATENT DOCUMENTS 2040104  4/1979  Fed. Rep. of Germany ........ 24/200

Primary Examiner—Peter A. Aschenbrenner
Attorney, Agent, or Firm—Thorpe, North & Western

[57] ABSTRACT

A clip device which is adapted to attach one belt to another comprises a base plate having a rectangular opening therein. A belt is attached to the base plate. An elongate clamp member is pivotally attached to the base plate such that the clamp can pivot from an upwardly extending position to a position in which it is adjacent to and spans the rectangular opening in the base plate. Means are provided for restraining the ends of the clamp from translational movement with respect to the base plate when the clamp member is in its position adjacent to and spanning the rectangular opening. An auxiliary belt is also disclosed which incorporates clip devices of the invention to attach the auxiliary belt to the seat belts in an automobile, whereby the auxiliary belt is then used to restrain a child on the lap of a person who is seated in the automobile and is using the seat belts in the automobile.

8 Claims, 2 Drawing Sheets

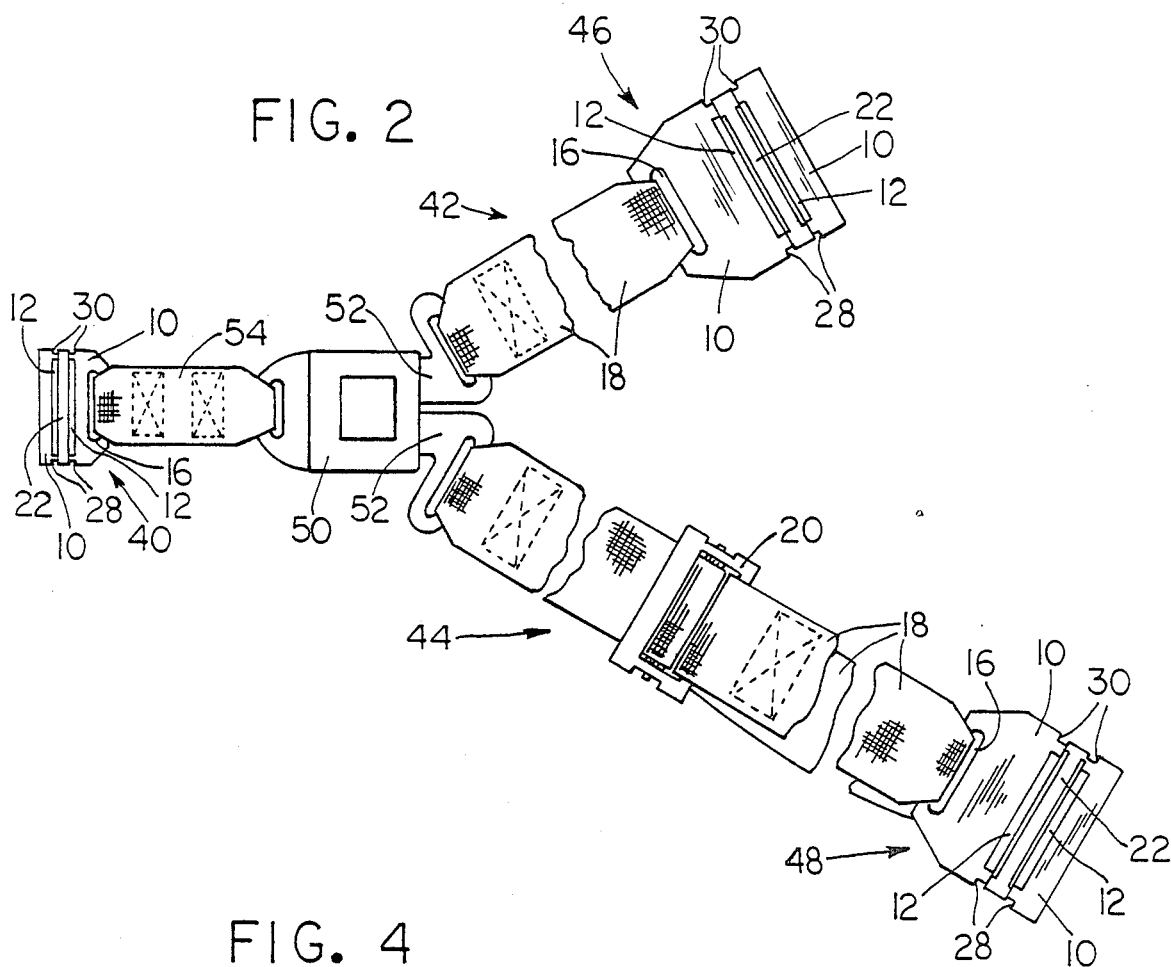
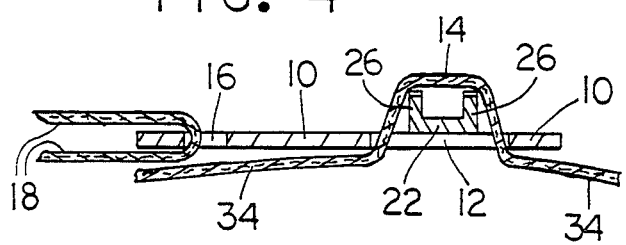
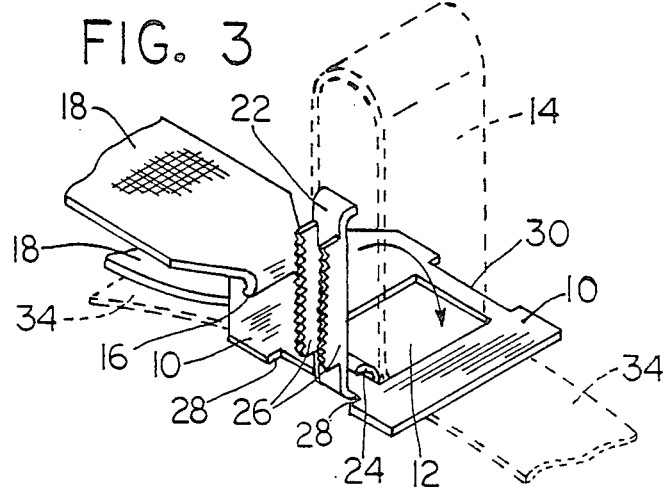

ATTACHMENT CLIP FOR WEB-TYPE BELTS

BACKGROUND OF THE INVENTION

1. Field

The invention relates to mechanical clip devices used in attaching a web-type belt to another such belt. In particular, the invention relates to mechanical clips used in attaching a safety belt such as used as seat belts in automobiles to another such belt. The invention further relates to a child restraint system utilizing mechanical clips as mentioned above wherein the child restraint system is quickly and easily attached to the seat belt of a passenger in an automobile so as to be adapted to restrain a child sitting in the passengers lap.

2. State of the Art

Mechanical clamping, connecting or clip devices are well known in the safety belt field and in other areas utilizing web-type belts similar to the belts used as safety seat belts in automobiles and airplanes. The most common type of such mechanical connector is that used in connecting the lap belts in seat belts used in automobiles and airplanes. Such connectors have a mechanical receptacle on the end of one belt and a male-type insert connector on the end of the other belt. Such connectors are convenient for connecting two belts together end-to-end but are of no use in attaching a belt to a second belt somewhere intermediate the ends of the second belt.

Clip or clamp members have been suggested for releasably connecting or attaching an end of the belt to a second belt. In U.S. Pat. No. 4,392,277 there is shown a clip member in which a loop of the belt to which the clip is to be attached is pulled through an elongate opening in the clip. A separate clamping member is then inserted into the loop, and the loop is then pulled down against the clamping member. The clamping member, through the force exerted thereon by the loop, frictionally clamps the loop between the clamping member and the clip member. Another similar clip which is used to releasably attach a shoulder strap to a lap-type safety belt is disclosed in U.S. Pat. No. 3,369,842.

OJECTIVES

A principal objective of the present invention is to provide an improved clip device used in attaching a web-type belt to another such belt. A particular objective is to provide such a clip device that has a pivotal bar restraint which is permanently attached at one of its ends to the clip for pivotal movement about that end, and further wherein the pivoted end of the bar restraint is restrained from translational movement with respect to the clip. Another objective is to provide a clip device that has a pivotal bar restraint which is permanently attached at one of its ends to the clip for pivotal movement wherein means are provided for locking the other end of the pivoted bar restraint to the clip so as to prevent translational movement of the otherwise free end of the bar restraint when it is engaged in the locking means. A further objective of the present invention is to provide an auxiliary restraining belt which is used with the seat belts in an automobile to restrain a child on the lap of a person who is seated in the automobile and is using the seat belts in the automobile.

SUMMARY OF THE INVENTION

The above objectives are achieved in accordance with the present invention by providing a novel, new, unique clip for a web-type restraining belt such as the seat belts used in airplanes and automobiles. The new clip is designed to be quickly and easily attached and detached to a web-type belt. The new clip allows a secondary belt to be quickly and easily attached and detached from a primary belt at some point intermediate the ends of the primary belt. The new clips are advantageously used with a child restraining belt, wherein the child restraining belt is attached to the seat belt of an occupant of the seat, with the result that a child can be held in the lap of the occupant and can be protected and restrained by the child restraining belt. The novel clips of this invention can, of course, be used for other purposes whenever it is necessary to releasably attach a clip to a web-type belt intermediate the ends of the belt.

In accordance with the invention, the novel clip comprises a substantially planar base plate having a rectangular opening through which a loop of a belt to which the clip is to be attached can be passed. Means are associated with the base plate for securely attaching a belt to the base plate along a first side edge of the base plate which is adjacent to a first longitudinal side of the rectangular opening in the base plate.

An elongate clamp member or bar is provided with means for pivotally attaching one end of the elongate clamp member or bar to the base plate along a second side edge of the base plate wherein the second side edge is adjacent to one of the shorter sides of the rectangular opening in the base plate. The pivotal connection or attachment of the elongate clamp member to the base plate allows the free end of the clamp member to be pivotally moved to a position adjacent to a third side edge of the base plate, wherein the third side edge is adjacent to the other of the shorter sides of the rectangular opening in the base plate.

Means are provided for restraining the pivotally connected end of the clamp member from translational movement with respect to the second side edge of the base plate. Further, means are provided for restraining the free end of the clamp member from translational movement with respect to the third side edge of the base plate when the free end of the clamp member is pivotally moved to a position adjacent to the third side edge of the base plate.

To attach the clip member to another belt, a portion of the belt is formed into a loop, and the loop is pulled through the elongate opening in base plate of the clip. Sufficient length of loop is pulled through the opening such that the elongate clamping member can be pivotally inserted into the loop. The loop is then pulled back through the opening in the base plate. The clamping member, through the force exerted thereon by the loop, frictionally engages the loop between the clamping member and the base plate, with the result that the clip is securely fastened to the belt. The clip can be readily removed by simply reversing the steps as given above for attaching the clip to the belt.

Additional objects and features of the present invention will become apparent from the following detailed description, taken together with the accompanying drawings.

THE DRAWINGS

Preferred embodiments of the clip and child restraint belt of the present invention representing the best modes presently contemplated of carrying out the invention are illustrated in the accompanying drawings, in which:

FIG. 2 is a top view of the child restraining belt in accordance with the present invention;

FIG. 3 is pictorial of a novel clip member in accordance with the present member and as used on the child restraining belt of FIGS. 1 and 2; and FIG. 4 is a cross section taken through the clip member of FIG. 3 along the line 4—4 of FIG. 3 with the pivotal clamp member in its position adjacent to the base plate of the clip member.

DETAILED DESCRIPTION OF THE ILLUSTRATED EMBODIMENTS

Figure 1:
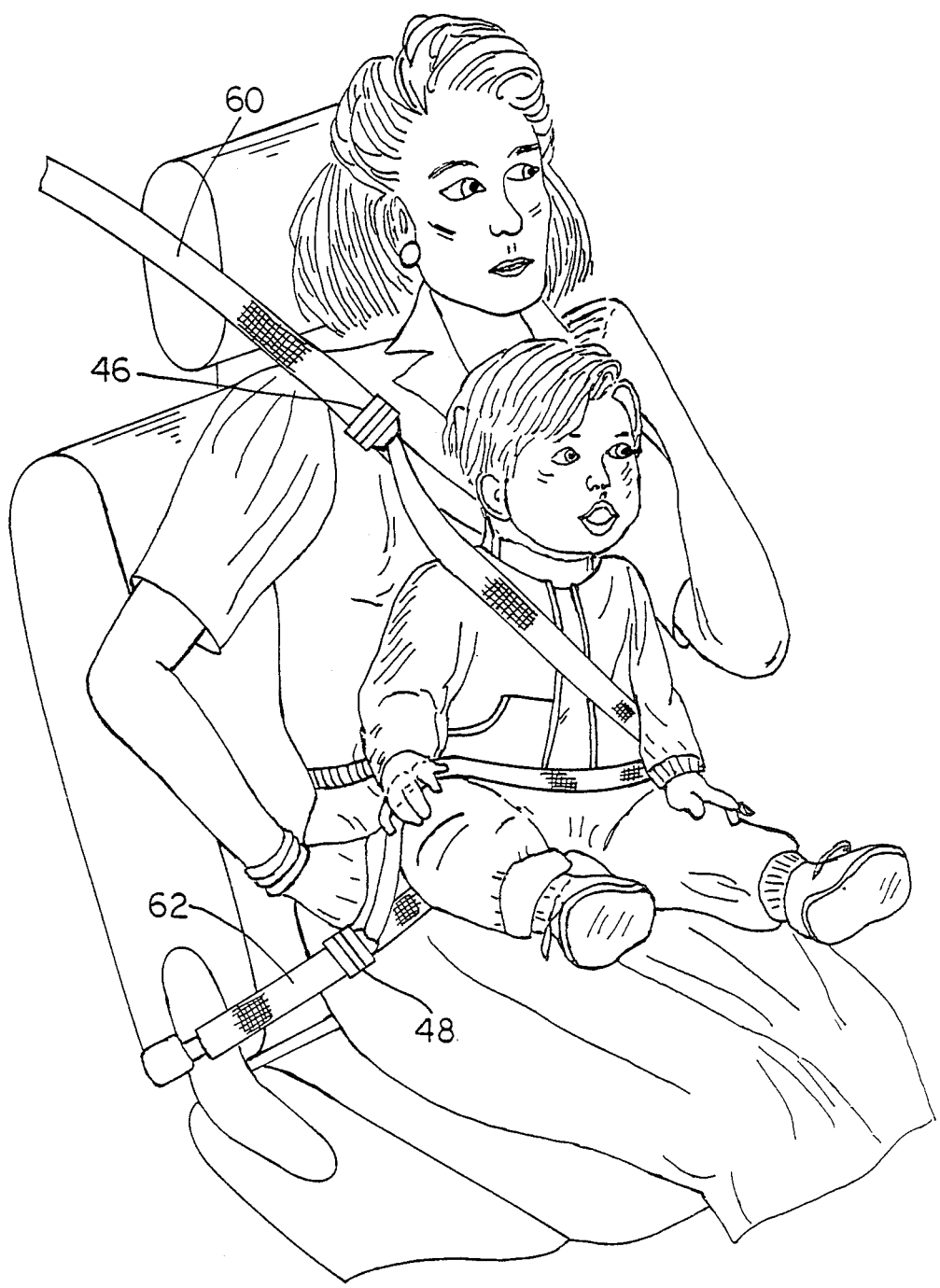
FIG. 1 is a pictorial of a woman and a child seated in the seat of an automobile, with the child being restrained in a child restraining belt in accordance with the present invention.

Referring to the drawings, there are shown a child restraint belt to be used in combination with a safety belt in an automobile and a novel, unique clip device that is used with the child restraint belt to releasably attach the child restraint belt to the safety belt in the automobile. In FIG. 1 there is shown a woman with a child sitting on a her lap. The child is held or restrained by an auxiliary safety belt in accordance with the present invention, wherein the auxiliary belt is attached to the standard safety belt being used by the woman who is sitting in the seat of an automobile.

One of the objectives of the present invention, as mentioned previously, is to provide a novel, unique clip device which is adapted to be quickly and easily attached and detached from a web-type belt, such as a safety belt used in an automobile. A preferred embodiment of such a clip device in accordance with the present invention is shown in FIGS. 2-4.

The clip device comprises a base plate 10 which has a rectangular opening 12 therein. The base plate 10 is made of sheet metal having a thickness of between about 1 and 3 millimeters, preferably about 2 millimeters. The rectangular opening 12 is adapted to receive a loop 14 of a web-type belt to which the clip device is to be attached. forming the loop 14 and attaching the clip device to the web-type belt will be further explained hereinafter.

Means are associated with the base plate 10 for securely attaching a belt, preferably a web-type belt to the base plate 10 along a first side edge of the base plate 10 which is adjacent to a first longitudinal side of the rectangular opening 12 in the base plate 10. As illustrated an elongate opening 16 is provided along the first side edge of the base plate 10, and the belt 18 which is to be securely attached to the base plate 10 is threaded through the opening 16. The end of the belt 18 which is threaded through the opening 16 is looped back and attached to the belt 18 such that the base plate 10 is permanently secured to the belt 18. As best shown in FIG. 2, the looped back portion of the belt 18 is secured to a customary buckle 20 which is attached to the belt 18 and which can be used to adjust the effective length of the belt 18.

An elongate clamp, member 22 is provided with means for pivotally connecting one end of the elongate clamp member 22 to the base plate 10 along a second side edge of the base plate 10 wherein the second side edge is adjacent to one of the shorter sides of the rectangular opening 12 in the base plate 10. By means of the pivotal connection to the base plate 10, the free end of the clamp member is adapted to be pivotally moved to a position adjacent to a third side edge of the base plate 10, wherein the third side edge is adjacent to the other of the shorter sides of the rectangular opening 12 in the base plate 10.

Preferably, the elongate clamp member 22 comprises a substantially flat bar which has a longitudinal length sufficient to extend substantially across the longitudinal length of the opening 12 in the base plate 10. Specifically, the longitudinal length of the clamp member 22 is sufficient to span the width of the base plate 10 in a direction parallel to the longitudinal axis of the rectangular opening 12. The clamp member 22 is adapted to pivot from a position in which it extends upwardly from the second side edge of the base plate 10 to a position in which the clamp member extends across the rectangular opening 12, with the free end of the clamp member 22 being adjacent to the third side edge of the base plate 10. The width of the clamp member 22 is between about 1 and 4 millimeters less than the width of the rectangular opening 12 in the base plate 10.

The means for pivotally connecting the one end of the clamp member 22 to the base plate 20 preferably comprises a loop 24 (see FIG. 3) which is formed at the one end of the clamp member 22. The loop 24 substantially encircles the portion of the second side edge of the base plate 10 which is adjacent to the rectangular opening 12. The loop 24 and the clamp member 22 can be rotated about the portion of the second side edge of the base plate 10 which is encircled by the loop 24. Advantageously, the loop 24 is formed by bending the end of the flat bar which forms the clamp member 22 upon itself in the shape of an arcuate loop.

In the preferred embodiment shown in the drawings the elongate clamp member 22 further comprises a pair of elongate sidewalls 26 which extend from mutually respective longitudinal sides of the flat bar portion of the clamp member 22. The sidewalls 26 extend upwardly and away from the base plate 10 when the free end of the clamp member 22 is moved to a position adjacent to the third side edge of the base plate 10. The upwardly extending ends of the elongate sidewalls 26 can be provided with serrated edges.

Means are provided for restraining the pivotally connected end of the clamp member 22 from translational movement with respect to the second side edge of the base plate 10. In the illustrated embodiment the means for restraining the pivotally connected end of the clamp member 22 from translational movement with respect to the second side edge of the base plate 10 comprises a notch 28 formed in the second side edge of the base plate 10, with the loop 24 in the end of the clamp member 22 being received within the notch 28.

Means are further provided for restraining the free end of the clamp member 22 from translational movement with respect to the third side edge of the base plate 10 when the free end of the clamp member 22 is pivotally moved to a position adjacent to the third side edge of the base plate 10. In the illustrated embodiment, the means for restraining the free end of the clamp member 22 from translational movement with respect to the third side edge of the base plate 10 comprises a second notch 30 formed in the third side edge of the base plate 10. Means are then associated with the free end of the clamp member 22 for engaging the second notch 30 when the free end of the clamp member 22 is pivotally moved to a position adjacent to the third side edge of the base plate 10. As best shown in FIG. 3, the means associated with the free end of the clamp member 22 for engaging the second notch 30 comprises a lip 32 which is formed by bending the free end of the clamp member 22 such that the lip 32 engages the second notch 30 when the free end of the clamp member 22 is pivotally moved to a position adjacent to the third side edge of the base plate 10.

In using the clip of the present invention, a loop 14 is formed in the belt 34 to which the clip is to be attached. The loop 14 is pulled through the rectangular opening 12 as shown in FIG. 3 (the loop 14 and belt 34 are shown in dashed lines). The clamp member 22 is held in its upwardly pivoted position as the loop 14 is drawn through the rectangular opening 24. When the loop 14 has been formed sufficient for the clamp member 22 to be pivoted downwardly within the loop 14, the clamp member 22 is pivoted such that its free end is adjacent to the third side edge of the base plate 10. The ends of the belt 34 from which the loop 14 is formed are then pulled tight such that the loop 14 is brought into tight engagement with the clamp member 22. As long as the loop 14 is maintained in a taught condition, that is the belt 24 forming the loop 14 is taught, the clip is firmly attached to the belt 24 and the clip will not slide or move along the length of that belt. Several forces keep the clip firmly attached in place on the belt 34 to which it is attached. The tension in the belt 34 clamps the clamp member 22 to the base plate 10. If the width of the clamping member 22 is sufficient, the clamping member 22 will clamp the belt 34 between the clamp member 22 and the base plate 10. If the clamp member 22 is somewhat smaller in width than the width of the rectangular opening 12, there will be little clamping of the belt 34 between the clamp member 22 and the base plate 10. In the latter situation, the loop 14 in the belt 34 tightly bends over the upstanding sidewalls 26 of the clamp member 22. The serrated edges in the sidewalls 26 engage the belt and prevent the belt from moving over the clamp member 24. Preferably, the width of the clamping member 22 is such as to achieve a clamping action in combination with the engagement of the belt 34 by the upstanding sidewalls 26 of the clamping member 22.

The clip can be removed from a belt to which it is attached by simply loosening the belt and pulling the loop up so as to free the clamping member 22. The clamping member 22 is pivoted upwardly to clear the loop 14, and the loop 14 is then pulled from the rectangular opening in the base plate 10 of the clip so as to free the clip from the loop 14 and belt 34.

The novel clips of the present invention are advantageously used to make a new child restraining belt which is used with the seat belts in an automobile to restrain a child on the lap of a person who is seated in the automobile and is using the seat belts in the automobile. A preferred embodiment of the auxiliary, child restraining belt is shown in FIG. 2, and the auxiliary belt is shown in use in FIG. 1.

The auxiliary restraining belt comprises a first clip member 40 which is in accordance with the clip member previously described. A pair of belts 42 and 44 are provided with means for securing respective one ends of the pair of belts 42 and 44 to the first clip member 40. Second and third clip members 46 and 48 are attached to the other ends of the belts 42 and 44, respectively. The clips 46 and 48 are identical to the clip member 22 previously described.

In a preferred embodiment the ends of the belts 42 and 44 opposite the clips 46 and 48 are attached to a conventional release buckle 50. The release buckle 50 is adapted to receive the male ends of connecters 52 on the ends of the belts 42 and 44. The release buckle 50 is then attached by a short segment of belt 54 to the first clip 40.

The auxiliary child restraint belt is shown in use in FIG. 1, wherein a child is shown seated in the lap of his mother. The mother is seated in an automobile seat and has the seat belt in the automobile in place around her.

The first clip of the auxiliary child restraint belt is attached to the waist belt around the mother on the left hand side of the mother (this connection is not visible in the pictorial view shown in FIG. 1). The second clip 46 of the child's belt is attached to the shoulder strap 60 of the mother's belt, and the third clip 48 of the child's belt is attached to the waist belt 62 of the mothers belt at the right hand waist of the mother.

The child is held securely in place in the mother's lap. In case of a sudden stop, the child is restrained from forward movement into the windshield or dashboard of the automobile by the child's belt which is secured to the mother's belt. By using the quick release buckle 50 as shown in FIG. 2, the child's belt can be disengaged from the child quickly when the child and mother want to get out of the automobile.

It is to be understood that the present disclosure, including the detailed description of the preferred embodiments, is made by way of example and that various other embodiments are possible without departing from the subject matter coming within the scope of the following claims, which subject matter is regarded as the invention.

I claim:

1. A clip which is adpated to attach one belt to another, said clip comprising a base plate having a rectangular opening therein through which a loop of a belt to which the clip is to be attached can be passed;

means associated with the base plate for securely attaching a belt to the base plate along a first side edge of the base plate which is adjacent to a first longitudinal side of the rectangular opening in the base plate;

an elongate clamp member comprising a substantially flat bar having a longitudinal length sufficient to extend substantially across the longitudinal length of the opening in the base plate and a width which is between about 1 and 4 millimeters less than the width of the rectangular opening in the base plate;

means for pivotally connecting one end of the elongate clamp member to the base plate along a second side edge of the base plate with said second side edge being adjacent to one of the shorter sides of the rectangular opening in the base plaet, so that the free end of said clamp member is adapted to be pivotally moved to a position adjacent to a third side edge of said base plate with said third side edge being adjacent to the other of the shorter sides of the rectangular opening in the base plate, wherein the means for pivotally connecting the one end of the elongate clamp to the base plate comprises a loop which is formed at said one end of the elongate clamp, with the loop substantially encircling the portion of the second side edge of the base plate which is adjacent to the rectangular opening, such that the loop and the elongate clamp can be rotated about the portion of the second side edge of the base plate which is encircled by the loop, and further wherein the loop at the one end of the elongate clamp is formed by bending the end of the flat bar back upon itself in the shape of an arcuate loop;

means for restraining the pivotally connected end of said clamp member from translational movement with respect to the second side edge of the base plate; and means for restraining the free end of said clamp member from translational movement with respect to said third side edge of the base plate when the free end of the clamp member is pivotally moved to a position adjacent to said third side edge.

2. A clip in accordance with claim 1, wherein the means for restraining the pivotally connected end of said clamp member from translational movement with respect to the second side edge of the base plate comprises a notch formed in the second side edge of the base plate, with the loop in the end of the one end of the elongate clamp being received in said notch.

3. A clip in accordance with claim 1, wherein the means for restraining the free end of said clamp member from translational movement with respect to said third side edge of the base plate comprises a second notch formed in the third side edge of the base plate; and means associated with the free end of said clamp member for engaging said second notch when the free end of the clamp member is pivotally moved to a position adjacent to said third side edge of the base plate.

4. A clip in accordance with claim 3, wherein the means associated with the free end of said clamp member for engaging the second notch comprises a lip which is formed by bending the free end of the clamp member such that the lip engages said second notch when the free end of the clamp member is pivotally moved to a position adjacent to said third side edge of the base plate.

5. A clip in accordance with claim 1, wherein the elongate clamp member further comprises a pair of elongate sidewalls which extend from mutually respective longitudinal sides of said flat bar such that the sidewalls extend upwardly and away from said base plate when the free end of the clamp member is moved to a position adjacent to said third side edge of said base plate.

6. A clip in accordance with claim 5, wherein the upwardly extending ends of said elongate sidewalls are provided with a serrated edge.

7. An auxiliary restraining system to be used with the waist belt and shoulder belt of seat belts in an automobile to restrain a child on the lap of a person who is seated in the automobile and is using the seat belts in the automobile, said auxiliary restraining system comprising a first clip member in accordance with claim 1;

a pair of auxiliary belts;

means for securing respective one ends of said pair of auxiliary belts in fixed communication with said first clip member;

a second clip member in accordance with claim 1, said second clip member being attached to the other end of the first belt of said pair of auxiliary belts' and a third clip member in accordance with claim 1, said third clip member being attached to the other end of the second belt of said pair of auxiliary belts, wherein in use, said first clip is attached to the waist belt on one side of the person who is seated in the automobile, the pair of auxiliary belts are positioned around the child in the person's lap, the second clip is attached to the waist belt on the other side of the person seated in the automobile, and the third clip is attached to the shoulder belt of the person seated in the automobile so that the child is effectively restrained between the auxiliary belts and the person seated in the automobile.

8. An auxiliary restraining system to be used with the waist belt and shoulder belt of seat belts in an automobile to restrain a child on the lap of a person who is seated in the automobile and is using the seat belts in the automobile, said auxiliary restraining system comprising first and second auxiliary belts;

means for securing respective one ends of said first and second auxiliary belts in fixed communication with the first clip member;

means for attaching the other end of the first belt to the second clip member; and means for attaching the other end of the second belt to the third clip member;

wherein in use, said first clip is attached to the waist belt on one side of the person who is seated in the automobile, the first and second auxiliary belts are positioned around the child in the person's lap, the second clip is attached to the waist belt on the other side of the person seated in the automobile, and the third clip is attached to the shoulder belt of the person seated in the automobile so that the child is effectively restrained between the auxiliary belts and the person seated in the automobile.

* * * * *